United States Patent [19]

Mitsuka

[11] Patent Number: 4,496,956
[45] Date of Patent: Jan. 29, 1985

[54] APERTURE MASK FOR IMAGE SCANNING AND RECORDING SYSTEM

[75] Inventor: Ikuo Mitsuka, Osaka, Japan

[73] Assignee: Dainippon Screen Manufacturing Co., Ltd., Kyoto, Japan

[21] Appl. No.: 399,526

[22] Filed: Jul. 19, 1982

[51] Int. Cl.³ ............................................. G01D 9/42
[52] U.S. Cl. .................................... 346/108; 358/302
[58] Field of Search ............ 346/108, 76 L; 358/296, 358/302; 350/162.2, 319

[56] References Cited

U.S. PATENT DOCUMENTS

| | | | |
|---|---|---|---|
| 3,391,597 | 7/1968 | Gropper | 346/108 U |
| 3,438,050 | 4/1969 | Aschenbrenner et al. | 346/108 U |
| 3,508,896 | 4/1970 | Turner | 350/319 X |
| 3,965,476 | 6/1976 | Wenander et al. | 346/108 X |
| 4,125,864 | 11/1978 | Arighton | 358/302 X |
| 4,402,574 | 9/1983 | McConnel | 350/319 X |

Primary Examiner—A. D. Pellinen
Assistant Examiner—Todd E. DeBoer
Attorney, Agent, or Firm—Millen & White

[57] ABSTRACT

An aperture mask for use in the recording section of an image scanning and recording system is disclosed. The aperture mask defines a pair of apertures, preferably of identical size and shape, in alignment with the optical path of a light beam for exposing a recording material, and the pair of apertures being arranged in spaced apart relation at a predetermined distance.

7 Claims, 11 Drawing Figures

4,496,956

APERTURE MASK FOR IMAGE SCANNING AND RECORDING SYSTEM

BACKGROUND OF THE INVENTION

The present invention relates to an image scanning and recording device for reproducing images on a recording sheet having a sensitive material, by means of image signals obtained by photoelectrically scanning original images. The invention more particularly relates to a light beam exposure section.

This type of image scanning and recording devices are practically used, e.g., in facsimile equipment and color scanners for producing color-separated images from a color original in the process of photomechanics.

Figure 1:
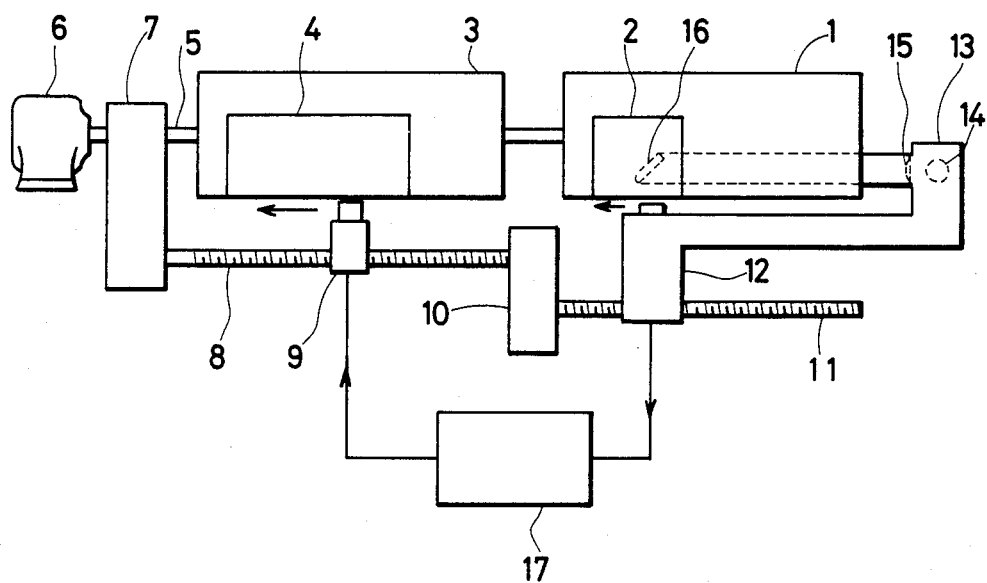
FIG. 1 schematically illustrates a color scanner for use in image scanning and recording applications such as facsimile equipment.

Such a color scanner will now be outlined with references to FIG. 1. In the drawing a color original 2 mounted on an original cylinder 1 in the scanning section, while in the recording section, a recording film 4 is mounted on a recording cylinder 3, said two cylinders 1 and 3 being synchronously rotated by a common shaft 5. The shaft 5 is driven by a motor 6 through a speed reducer 7. The rotation of the motor 6 is also transmitted to a screw shaft 8 in a different speed reduction ratio to drive a recording head 9 along the recording cylinder 3. The rotation of the screw shaft 8 is transmitted to a screw shaft 11 through a stepless speed changer 10 to drive a pickup head 12 along the original cylinder 1. The pickup head 12 is associated with an original illuminating device 13 comprising a light source 14, focusing lens 15 and a mirror 16. The pickup head 12 contains color filters, photoelectric tubes, etc., and produces image signals according to the tones and gradations of the original, said image signals being transferred to a color correction circuit 17. The image signals amplified and compensated in the color correction circuit 17 enter the recording head 9, and the recording film 4 is exposed to light for color-separated images as from a laser beam source.

Figure 2:
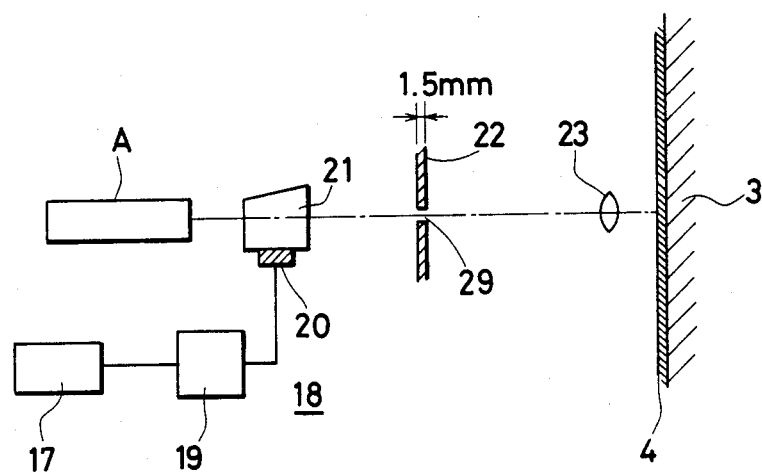
FIG. 2 schematically illustrates a recording optical system using a laser beam source.

An outline of a recording optical system using a laser beam source A is shown in FIG. 2. For a laser beam, He-Ne is used because of its superiority, and for a light modulator for laser beam, an acousto-optic modulator 18 is used. The image signals obtained from the original 2 and corrected are applied, with variations in their intensity, to an acousto-optic modulator driving circuit 19 to produce high frequency signals, which drive a piezoelectric transducer 20. The piezoelectric transducer 20 converts the high frequency signals into acoustic signals, which are fed into an acousto-optic medium 21. Thus, when the laser beam from the laser beam source A is introduced into the acoustic-optic medium 21, it is diffracted by sound waves and thereby modulated, and the laser beam emitted therefrom passes through an aperture 29 in an aperture mask 22 and then through a focusing lens 23 to impinge on the recording film 4 on the recording cylinder 3 for exposure and recording of color-separated images.

Figure 3:
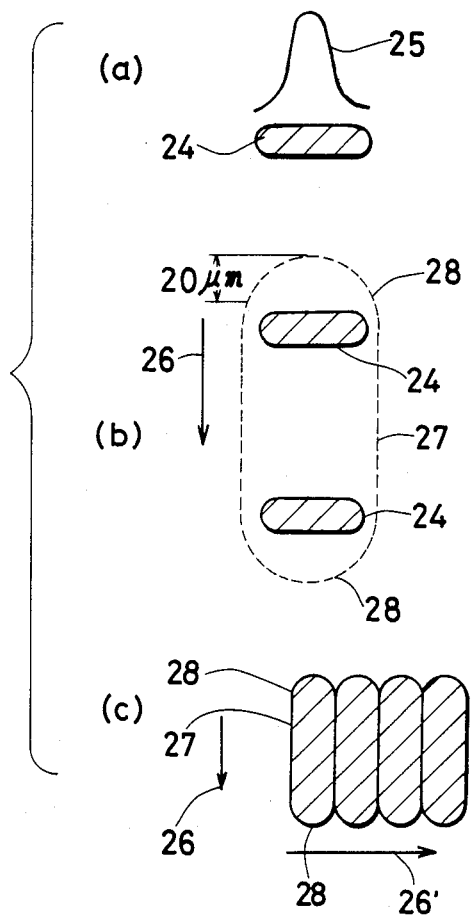
FIG. 3(a)–3(c) respectively illustrate normal intensity distribution curves from use of the laser of FIG. 2, the exposure and development region of the film, and the resultant wave pattern formed by scanning according to prior art.

In the case of exposure-wise describing lines on the recording film 4 using the conventional image scanning and recording device described above, the intensity distribution of a flat laser beam 24 emitted from the focusing lens 23 is as shown in FIG. 3(a) presenting a normal distribution curve 25 around the beam. As a result, if exposure is effected in a main scanning direction 26, which is associated with scanning in the direction of the circumference of the rotating recording cylinder 3, the film is exposed and developed in a manner shown by an area surrounded with a dotted line 27 as shown in FIG. 3(b) wherein upper and lower arcuate portions 28 represent unnecessary exposure, due to an adjacency effect caused by the exposure and development of the film. If, therefore, scanning exposure is effected in the main scanning direction 26 and secondary scanning direction 26' as shown in FIG. 3(c), waves are formed in the upper and lower arcuate portions 28 in the transverse direction (secondary scanning direction 26'); thus, straight edges cannot be formed.

Figure 4:
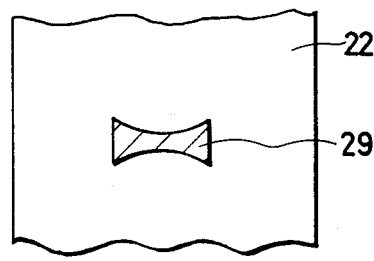
FIG. 4 shows a prior art concave shaped lens for apertures in the recording optical system of FIG. 2 to eliminate the drawbacks resulting as shown in FIG. 3(c)

To eliminate this drawback, it has been the practice to use a concave lens shape for an aperture 29 formed in an aperture mask 22, as shown in FIG. 4. However, the formation of a lens of such shape is expensive.

Figure 5:
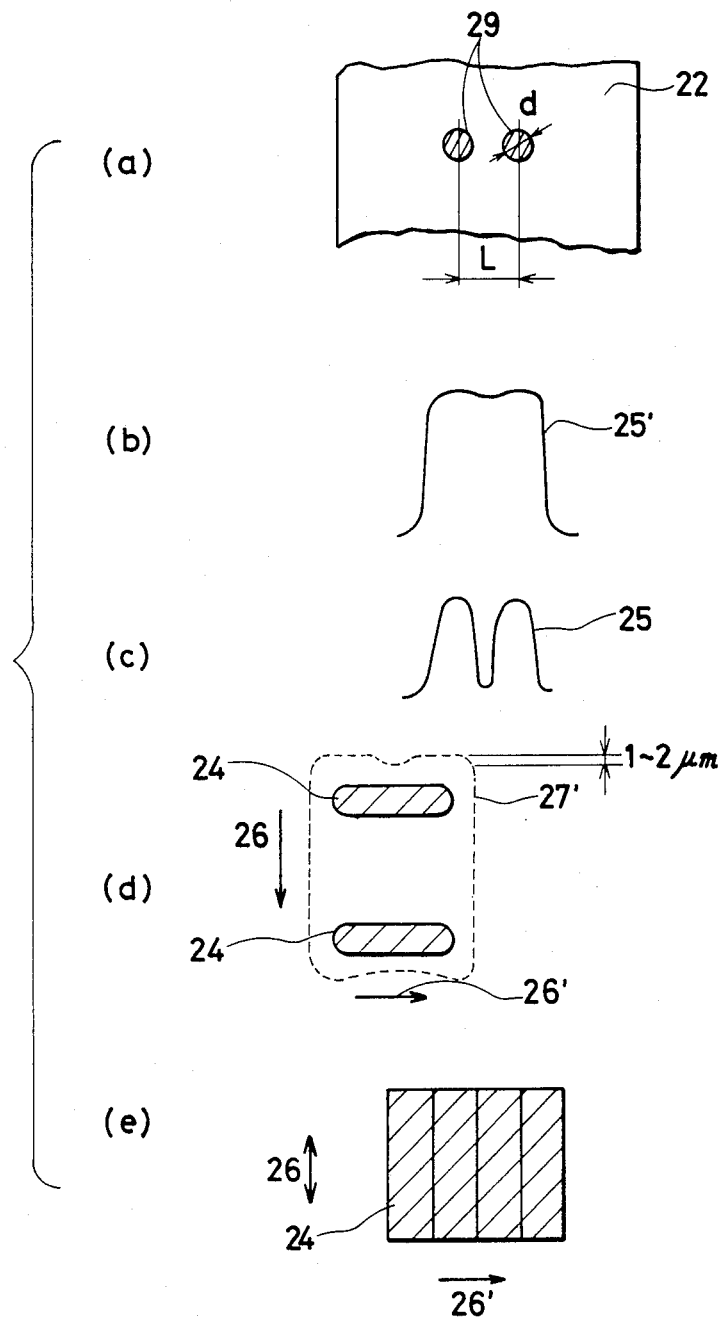
FIGS. 5(a)–5(e) respectively illustrate the aperture distribution employed in the invention, with the resultant image obtained by exposure and development as well as the intensity distribution obtained after passing through the focusing lens, the scanning portion exposed, and the pattern formed by scanning according to the invention.

The present invention uses an aperture mask 22 having a pair of round apertures 29 of diameter d spaced a distance L apart from each other, as shown in FIG. 5(a). Thus, if exposure is effected with this aperture mask 22 in the main scanning direction 26, the laser beam 24 becomes tiny twin beams as they pass through the pair of aperture 29. The intensity distribution obtained after they pass through the focusing lens is as shown in FIG. 5(c), while one obtained by exposure and development of a film is as shown in FIG. 5(b) due to adjacency effect. If it is scanned, a portion surrounded with a dotted line 27' shown in FIG. 5(d) is exposed. Even if the upper and lower horizontal lines have unevenness as a result of scanning exposure in the main scanning direction 26 and secondary scanning direction 26', such unevenness is only about 1–2 μm in cases where, e.g., d=0.3 mm and L=1 mm, so that they are substantially smooth and lines can be accurately described as shown in FIG. 5(e).

In brief, the present invention has the following advantages.

(1) The respective intensities of beams immediately after leaving the two apertures are as shown in FIG. 5(a), but the beam intensities between the two apertures are superimposed on each other due to fuzziness cause by the lens, and adjacency effects due to exposure and development, as a result of which an even intensity distribution is obtained, ensuring that smooth lines are described on the portion exposed by scanning.

(2) Since it is only necessary to form two simple apertures in a thin aperture mask, the processing is easy.

Figure 6:
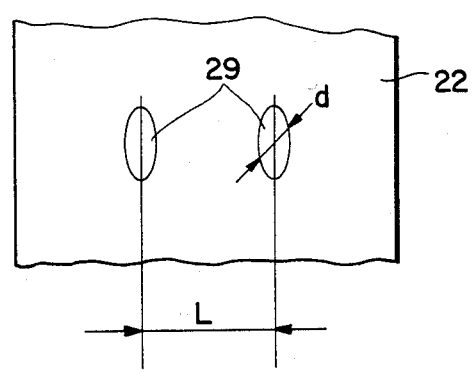

It goes without saying that the shape of the apertures is not limited to a circle but may be variously changed according to required conditions as is shown in FIG. 6 with like reference numbers to the drawing in FIG. 5a.

I claim:

1. In an image scanning and recording system having a recording section comprising laser source means for providing a laser beam, modulating means for modulating the laser beam in a manner corresponding to an image signal produced by scanning of an original in an original scanning section, collimating means for collimating the modulated laser beam on a photographic recording medium for scanning, in a primary scanning direction and in a secondary scanning direction, said recording medium with the laser beam, the improvement wherein said collimating means comprises: an aperture mask positioned between said modulating means and a focusing means; said aperture mask having a pair of apertures in alignment with the optical path of the laser beam; and said apertures being of identical size and shape and disposed in parallel to said secondary scanning direction of said recording medium, at a predetermined distance between the centers of the apertures, and the apertures being of such size and shape to thereby produce sharply defined edges in the imaged pattern of the laser beam on the recording medium in the secondary scanning direction when scanning is conducted, with the edge unevenness in the image produced being about 1-2 $\mu$m as compared to edge unevenness of about 20 $\mu$m produced in the absence of said aperture mask.

2. An image scanning and recording system as in claim 1 wherein said pair of apertures are of identical size and shape.

3. An image scanning and recording system as in claim 1 wherein said laser source means is an He-Ne laser.

4. An image scanning and recording system as in claim 1 wherein said image scanning and recording system is a color scanner for producing color-separated images from a color original.

5. An image scanning and recording system as in claim 1 wherein said apertures in the aperture mask are of non-circular shape.

6. In an image scanning and recording system having a recording section comprising laser source means for providing a laser beam, modulating means for modulating the laser beam in a manner corresponding to an image signal produced by scanning of an original in an original scanning section, collimating means for collimating the modulated laser beam and focusing means for focusing the modulated laser beam on a photographic recording medium for scanning, in a primary scanning direction and in a secondary scanning direction, of said recording medium with the laser beam, the improvement wherein said collimating means comprises: an aperture mask positioned between said modulating means and said focusing means; said aperture mask having a pair of apertures in alignment with the optical path of the laser beam; and said apertures being disposed in parallel to said secondary scanning direction of said recording medium, are round and of identical size, and at a predetermined distance from each other wherein the distance between the center of the apertures is equal to 1 mm and the diameter of the apertures is equal to 0.3 mm to thereby produce sharply defined edges in the imaged pattern of the laser beam on the recording medium in the secondary scanning direction when scanning is conducted to thereby result, when employed, in an edge unevenness in the image produced therewith of about 1-2 $\mu$m as compared to edge unevenness of about 20 $\mu$m produced in the absence of said aperture mask.

7. In an image scanning and recording system having a recording section comprising laser source means for providing a laser beam, modulating means for modulating the laser beam in manner corresponding to an image signal produced by scanning of an original in an original scanning section, collimating means for collimating the modulated laser beam and focusing means for focusing the modulated laser beam on a photographic recording medium for scanning, in a primary scanning direction and in a secondary scanning direction, of said recording medium with the laser beam, the improvement wherein said collimating mean comprises: an aperture mask positioned between said modulating means and said focusing means; said aperture mask having a pair of apertures in alignment with the optical path of the laser beam, and said apertures being disposed in parallel to said secondary scanning direction of said recording medium, being of generally round shape and of the same size, and at a predetermined distance from each other wherein the distance between the centers of the apertures is equal to 1 mm and the size of the aperture is equal to a diameter of about 0.3 mm to thereby produce sharply defined edges in the imaged pattern of the laser beam on the recording medium in the secondary scanning direction when scanning is conducted to thereby result, when employed, in an edge unevenness in the image produced therewith of about 1-2 $\mu$m as compared to the edge unevenness of about 20 $\mu$m produced in the absence of said aperture mask.

* * * * *